United States Patent [19]
Bahr et al.

[11] 3,790,040
[45] Feb. 5, 1974

[54] WORM METERING DEVICE WITH SHUT-OFF MECHANISM

[75] Inventors: Siegmund Bahr, Stuttgart-Uhlbach; Walter Saur, Korntal, both of Germany

[73] Assignee: Fr. Hesser Maschinenfabrik AG, Stuttgart, Germany

[22] Filed: Feb. 24, 1972

[21] Appl. No.: 228,900

[30] Foreign Application Priority Data
Feb. 25, 1971   Germany.................. P 21 08 911.2

[52] U.S. Cl. .............................. 222/413, 222/559
[51] Int. Cl. .......................................... G01f 11/20
[58] Field of Search ... 222/559, 547, 549, 412, 413; 425/208, 209

[56] References Cited
UNITED STATES PATENTS
2,464,030   3/1949   Engstrom ........................... 222/559
3,486,664   12/1969   Loomans ........................... 222/413

FOREIGN PATENTS OR APPLICATIONS
230,910   1/1960   Australia ............................ 425/208

*Primary Examiner*—Stanley H. Tollberg
*Assistant Examiner*—H. Grant Skaggs

[57] ABSTRACT

An apparatus and method for metering material, such as in container filling operations, which have closure means in the form of a first movable member, preferably of an annular configuration, operating in conjunction with second closure means in the form of a conically shaped closure element which the first closure means is adapted to abut in mating sealing engagement to prevent discharge of material.

8 Claims, 3 Drawing Figures

WORM METERING DEVICE WITH SHUT-OFF MECHANISM

The invention relates to metering apparatus.

More particularly, this invention relates to an apparatus and method for metering materials.

Many different types of metering apparatus are known in the art. One species of such apparatus employs the principle of a worm gear for metering desired amounts of materials — those known as worm metering apparatus. One of the problems associated with the latter type of apparatus relates to providing a positive flow control of the material through the metering apparatus when it is in a closed position — that is to say, it is somewhat difficult to provide positive control means to prevent leakage or the trickling of material from the metering apparatus when it is in a shut or closed position.

One proposed solution for closure for worm metering apparatus is already known, in German which a closure means in the form of a resilient shut-off or closure disc is attached to the discharge end of a metering worm, together with a sleeve mounted on a filler tube of the apparatus; the lower end of the sleeve being adapted to be pressed against the closure disc to provide a seal. While having advantageous features in its own right, it has also been found that this type of arrangement has the disadvantage that when the material discharged from the filler tube of the metering apparatus which flows approximately at right angles to the closure disc (which of course rotates), the material is ejected or flung out substantially horizontally by the rotating closure disc.

When the metered material has to be packaged in containers, the horizontally projected material must be deflected in order to be placed into the container. This, of course, will require additional components; however, the problem is more complicated when worm metering devices are incorporated into the shaping and filling funnels or mandrels of tubular type bag machines. In this latter type of machine, the requirement to deflect the metered material from a horizontally projected path, into a bag or container, cannot readily be modified to include components to deflect the metered material due to space restrictions, with the result that the output of the tubular type bag machines is severely restricted.

With this invention, applicant has developed an apparatus and method which overcomes the disadvantages of the above-described prior art. More particularly, in accordance with one aspect of this invention, in such metering devices wherein it is desired to meter material through a discharge outlet and in which the metering device includes closure means adapted to prevent the discharge of material, there is provided the improvement wherein the closure means comprises first cooperating movable closure means, and second cooperating closure means mounted in operative relationship to said first cooperating movable closure means, the second closure means having a generally tapering conical configuration adapted to matingly engage in sealing relationship with the first cooperating movable closure means when the first and second closure means are brought into engagement, to prevent the discharge or leakage of material through the metering device.

In accordance with a further aspect of this invention, there is provided a method of metering flowable material and for controlling the discharge of metered material or preventing its leakage, by the steps of providing a source of flowable material to be metered, passing the flowable material through a metering device, metering a desired allotment of said material by passing said material between first cooperating movable closure means and second cooperating closure means with the second closure means having a generally tapering conical configuration whereby the flowable material passes between said first and second closure means in a tangential direction to the normal direction of flow of the material, and when the desired allotment of said material has been metered, closing said closure means by bringing said first and second cooperating closure means into sealing engagement.

The apparatus and method of the present invention may be carried out and practiced in the metering of various types of flowable material; the apparatus and method particularly lend themselves to the metering of desired allotments or quantities of materials into containers in filling processes and apparatus in which the containers are filled by a filling machine incorporating the metering device and process of the present invention in conjunction with a source of supply of the material to be metered, and in which such apparatus and processes include appropriate means and steps for presenting a container to be filled to the metering device. To this end, various types of bag filling devices are well known in the art and the apparatus and process of the present invention may be incorporated therein to provide very desirable improvements in efficiency and output of the apparatus.

More particularly, and in greater detail of the present invention, the use of first and second closure means, as described above and hereinafter, which includes a generally conical configuration, as opposed to the prior art arrangements of planar closure discs, has been found to provide many advantageous features particularly in the efficiency and output of the bag filling apparatuses and processes. Specifically, the inventive features of the apparatus and process of the present invention with respect to the closure means operates to deflect the material being metered, from a metering worm of the device and a conduit or tube only to a very slight amount, thus permitting the metered material to flow very rapidly. The use of the conical closure means, conversely, does not accelerate the speed of the material peripherally and the "slinging action" of the prior art is substantially eliminated.

In the apparatus of the present invention, the first cooperating closure means is movable between first and second stations (i.e., initial and terminal positions) one of which represents an "open" position for the metering device and the other of which represents a "closed" position where the first closure means is in engagement with the second closure means. Thus, any suitable means for reciprocating the first closure means between the first and second positions may be employed, operating in timed relationship to the metering worm of the device. The first closure means may comprise an annular sleeve or conduit which has a diameter greater than a portion of the diameter of the second conically shaped closure means, but which diameter of the annular sleeve is less than the greatest diameter of the conically shaped second closure means. In this manner, the reciprocal movement of the first closure means will be brought into engagement with the second conically shaped closure means upon movement of the former into a "closed" position. The first closure means in the form of an annular sleeve or the like, may be of a "floating" or "suspended" type if desired. It may be constructed so as to be of rigid or resilient material. The floating or suspended arrangement for the first cooperating movable closure means will be advantageous to ensure a tight seal, even if the metering worm is a floating metering worm and if the rotation of the metering worm and that of the second closure element are not precisely accurate. Still further, in an alternate form, the sleeve may have a tapering internal side wall, the degree of taper of which generally or substantially matches the degree of taper of the conical second closure means.

If desired, the sleeve may also be of a type which is rotatable relative to the second closure means — or in a preferred embodiment, at least one of the first and second closure means rotate relative to the other about their longitudinal axis. This preferred feature of the present invention is particularly useful since in some cases, due to a defective adjustment of the control or incipient break-down of the drive means for the metering worm, the sleeve may come into juxtaposition with the second closure means before the metering worm is stopped — which may lead to frictional wear and damage to the drive means. Thus, the rotation of at least one of the first and second cooperating closure means will substantially shorten the duration of any relative motion between the two conponents when in sealing relationship and will largely overcome any frictional wear as well as reducing the stress on any drive means.

The second cooperating closure means, in the form of a generally conical shaped member, is mounted in operative relationship to the metering worm of the metering device. This element is preferably rigidly connected but, need not necessarily be so. Any suitable means may be provided for mounting the second closure member to the metering worm. A particularly preferred form of this second closure means is where it has an exterior surface which forms a smooth cone; alternately, the configuration of this closure means may be such that it merges gradually at its upper end into a generally cylindrical member which joins or is connected to the end portion of the metering worm.

If desired, the second closure element may also be formed so as to provide a flat annular sealing surface located at the lower or bottom portion of the member, so that the sleeve of the first closure member may be pressed into juxtaposition around the lower end of the second closure means.

As briefly mentioned above, the closure means and process of the present invention can be incorporated into various metering worm devices. Thus, for example, such a metering device may include drive means for rotating the metering worm, a chamber for retaining a flowable material for metering, inlet means for placing a supply of flowable material into the chamber, and control means adapted to control the rotation of the metering worm to a prescribed or predetermined number of rotations for supplying a predetermined amount of material. In this respect, a preferred embodiment of this invention consists in the control means operating in conjunction with the means for reciprocating the first movable closure means between first and second stations, the latter means comprising a lever operatively connected to the sleeve by a further arm or linkage, reciprocating means such as a piston assembly and means for spring-loading the arm to which the linkage is connected for causing the arm or lever to return to a first position following actuation of the arm or lever by the piston means in moving the first closure means to a second position. In this respect, the linkage means connecting the arm or lever to the sleeve may be of a type in which the sleeve is rotatable; to this end, the linkage may mount the sleeve by means of a bearing or sliding ring to permit relative rotation of the sleeve to the linkage.

Having thus generally described the invention, reference will now be made to the accompanying drawings illustrating preferred embodiments and in which.

Figure 1:
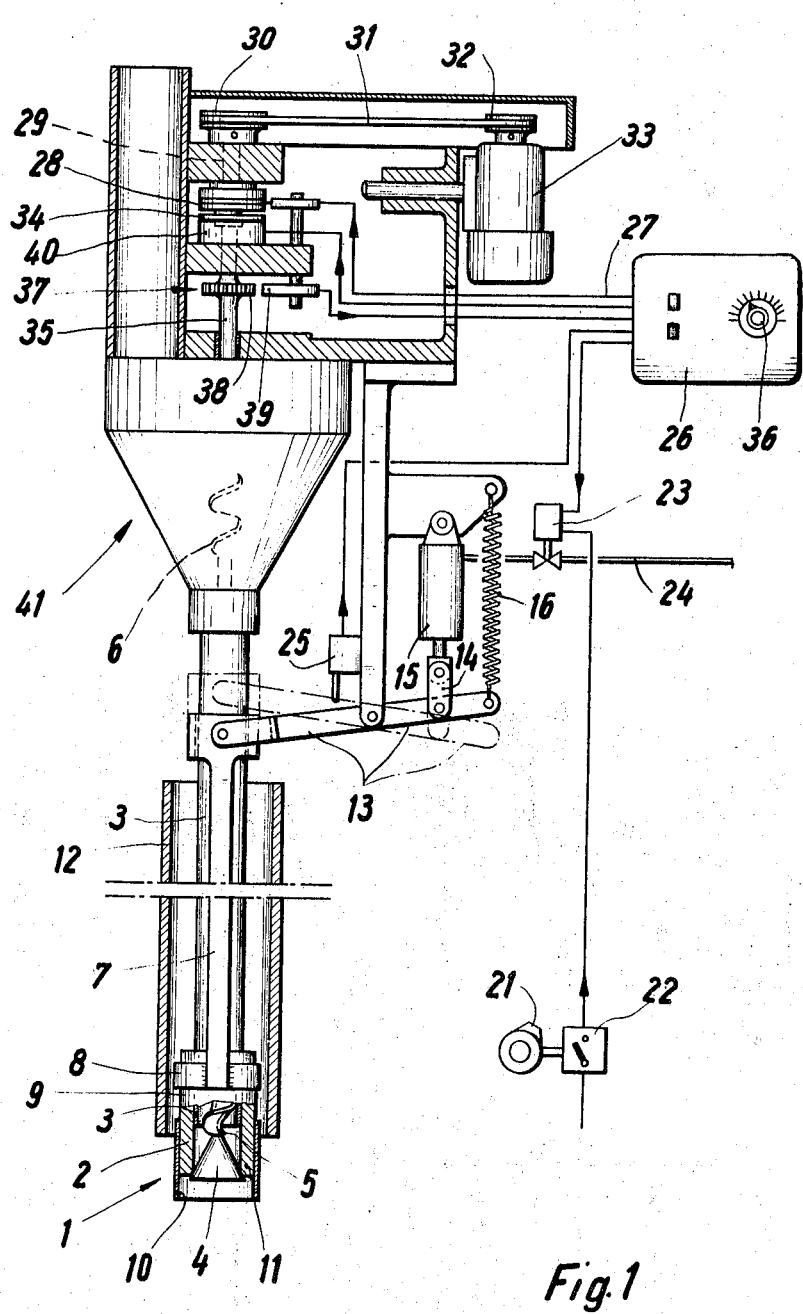
FIG. 1 is a side elevational view, partially in section of a worm metering device of the present invention.

Referring now to the drawings in detail, the closure means of the present invention is indicated generally by reference numeral 1 adapted to operate in conjunction with a tubular bag machine which supplies a container adapted to be filled with a metered amount of flowable material; the closure device of the present invention operates in conjunction with a metering apparatus indicated generally by reference numeral 41 which includes a chamber adapted to retain flowable material to be metered with suitable inlet means for feeding the flowable material into the chamber.

Figure 2:
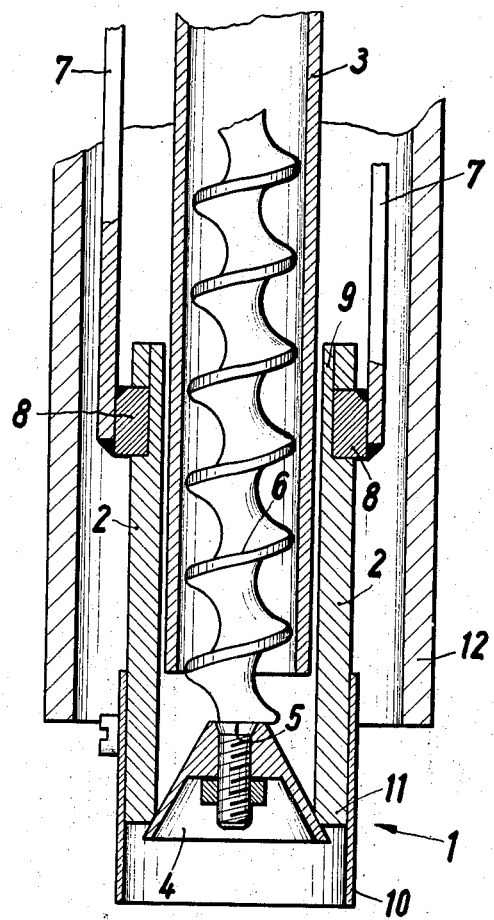
FIG. 2 is an enlarged sectional view of the worm metering device of the present invention showing the closure means in greater detail (in a closed position)
Figure 3:
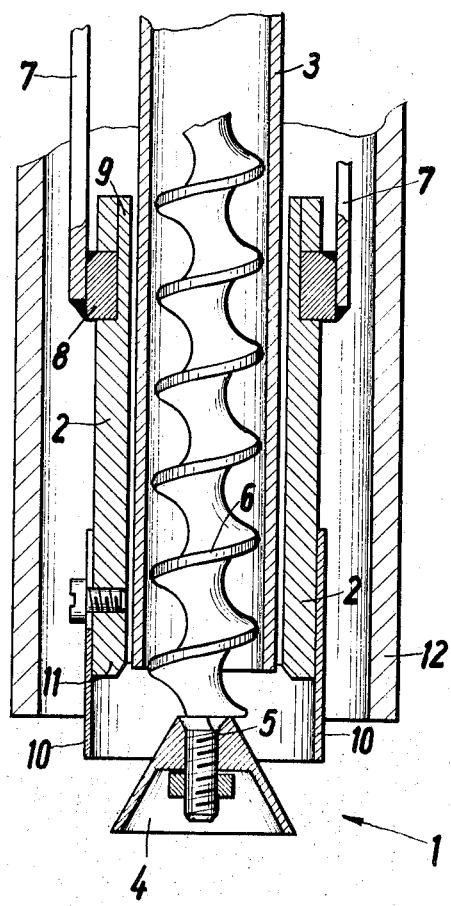
FIG. 3 is a view similar to FIG. 2 but in which the closure means is shown in an opened condition.

The closure means of the present invention has first cooperating movable means in the form of a sleeve 2 which is adapted to externally surround a filler conduit 3 of the metering apparatus. The sleeve 2 is longitudinally movable — i.e., vertically as illustrated in the drawings, with respect to the filler tube 3; there is provided means for vertically displacing the sleeve 2 in the form of a connecting linkage 7 attached by means of a sliding ring or bushing 8 to the upper end 9 of the sleeve 7 in such a manner that the sleeve is capable of rotating about its longitudinal axis with respect to the linkage 7. If desired, the sleeve 2 may include an extension indicated by reference numeral 10, fixedly or adjustably attached thereto by suitable means — e.g., a screw or the like as shown in FIGS. 2 and 3. This extension serves to guide the metered material as explained hereinafter in greater detail.

Preferably as illustrated in FIGS. 2 and 3, the extension which in effect forms a guide conduit for the metered material, is adjustably mounted beyond the outlet end 11 of the sleeve 2 for different types of apparatus.

The axial or up and down movement of the sleeve 2, through linkage 7 is accomplished by connecting the linkage 7 to a lever 13, which in turn is connected to an intermediate arm 14 to a pneumatic or hydraulic piston assembly indicated generally by reference numeral 15. The latter is fixedly secured to a frame member of the metering apparatus; likewise lever 13 is secured at a pivot point to a further frame member of the apparatus. A coil spring 16 is connected to the lever 13 at the end opposed to that at which linkage 7 is connected thereto; the other end of the spring 16 is connected to a frame member so as to spring-load the lever 13 for the purposes described hereinafter. The piston assembly, in the embodiment illustrated, is connected to a supply line 24 (such as a supply of compressed air).

The second cooperating closure means of the present invention comprises a substantially conical and tapering closure element indicated generally by reference numeral 4. The element 4 is connected to the lower end portion 5 of a metering worm 6, the latter of which rotates in the filler tube 3 thereby causing rotation of the closure element 4. Any suitable means may be used to secure the element 4 to the bottom portion 5 of the metering worm 6, such as a bolt or the like as illustrated in FIGS. 2 and 3. However, although the closure element 4 is preferably rigidly connected to the metering worm 6, this need not be so if desired. As illustrated in the drawings, the closure element 4 has an exterior of a generally smooth conical shape; however, if desired, it may also have a configuration such that at its upper end it gradually merges into a generally cylindrical portion which joins the lower end 5 of the metering worm 6.

Referring now generally to the other components of the metering device, there is provided a motor 33 which may be suitably mounted on the frame of the apparatus, with the motor 33 mounting a drive shaft and pulley 32. Connected to the upper end portion of the metering worm 6 is a shaft 35, which in turn, is connected to a friction disc 34. Mounted in operative relationship to this latter component is a clutch 28, which in turn, is mounted on a shaft 29. The latter component mounts a belt pulley 30, with a belt 31 extending between the pulleys 30 and 32. Thus, the motor 33 serves to rotate the shaft 29, and the rotary motion of the clutch 28 is then transferred by means of a friction disc 34 to the shaft 35 and thus rotates the metering worm 6. Rotation of the latter component causes the flowable material to be downwardly moved through the filler tube 3. In this respect, this latter component with the closure means of the present invention may be surrounded by a hollow forming mandrel 12 of a tubular bag machine (not shown).

The metering device as described above, may be actuated by means of a cam 21, which in turn, is operatively connected to a tubular bag machine, with the cam 21 actuating a switch 22. The switch 22 is operatively connected to a valve 23 (such as a magnetic valve) which in turn is operatively connected to the supply line 24 connected to the piston assembly 15.

The overall apparatus will also include a control unit indicated generally by reference numeral 26, operating in conjunction with the rotation of the metering worm 6. The control unit includes means such as a dial or knob 36 to permit adjustment of the number of rotations of the metering worm. Instrument 37 comprises means for measuring the angle of rotation and includes a toothed disc 38 mounted on shaft 35, and operating in conjunction with a pulse generator 39.

Also, control unit 26 is connected to a switch 25, which in turn, is adapted to be actuated by the movement of lever arm 13 in the manner described hereinafter. The switch 25 may be mounted to the frame of the apparatus.

In operation, and utilizing the metering apparatus as described above in conjunction with a bag filling apparatus, a source of flowable material to be metered is provided. In sequence, cam 21 is driven by, e.g., a tubular bag machine (not shown) to actuate the switch 22; the latter in turn opens the magnetic valve 23. This permits the piston assembly to pivot the lever 13 against the tension of the spring 16, thereby raising the sleeve 2 through the linkage 7. Shortly before the lever 13 reaches the terminal or uppermost position (as shown in dotted lines in FIG. 1), the lever being positioned in operative relationship to the switch 25, actuates the latter which, as described above, is connected to the control unit 26. The control unit 26, connected via line 27, switches-in the magnetic clutch 28 driven by the motor 33 through the shaft 29, pulleys 30 and 32 and drive belt 31. The rotary motion of the clutch 28 is then transferred by the friction disc 34 to the shaft 35 which as described above, is connected to the metering worm 6. This in turn causes the material to be metered to discharge from the filler tube 3 and slide over the conically shaped cone element 4 with only a slight deflection. After the material is thus discharged, it will be projected radially from metering worm 6 and deflected downwardly by the guide sleeve 10. The control unit 26, which is adjustable as to the number of rotations of the worm 6 desired, switches off the clutch 28 upon the predetermined number of rotations of the metering worm 6 being made and as measured by the measuring instrument 37 (i.e., the disc 38 mounted on the shaft 35) and the pulse generator 39 operating inductively. Once clutch 28 is switched off, a brake element 40, mounted in operative relationship to a friction disc 34, may then be actuated to shut off the metering operation. Control unit 26 then actuates magnetic valve 23 in such a manner that the piston assembly 15 is disconnected relative to the supply line 24 and the action of spring 16 will then pivot lever 13 back to its initial or starting position. As a result of this latter operation, the sleeve 2 is then placed in a "closed" position - i.e., in a mating engaging position with respect to the closure element 4 to prevent leakage of material.

If desired, the control unit 26 may also contain a delaying member component, functioning so that the descent of the sleeve 2 is delayed at the onset of the descent so that the metering worm 6 is rotating relatively slowly, or is substantially at a standstill when the sleeve 2 contacts the closure element 4 in mating engaging relationship.

It should also be pointed out with respect to the above-described preferred embodiments that if, during the operation of the metering device, or as a result of a breakdown of the apparatus, the sleeve 2 is already pressed in juxtaposition or sealing engagement with the closure element 4 while the latter is still rotating, the resulting friction between the two contacting components will cause sleeve 2 to rotate relative to the ring or bearing 8. In this way, any damage to the linkage 7 will be prevented. Still further, wear at the point of contact between the sleeve 2 and the closure element 4 is also restricted to a minimum by the rapid drop in the slipping speed.

Still further, with respect to the above-described embodiments, and if desired, the advantages of the present invention may be obtained by rotatably mounting the closure element 4 on the end portion 5 of the metering worm 6. It would then be desirable, in this case, to provide a selective or predetermined amount of friction between the metering worm 6 and the closure element 4, in such a manner that the closure element 4 reaches a predetermined peripheral velocity during the metering operation to prevent the material being metered from flowing over the closure element 4 and adhering thereto. However, as will be understood, the adherence of the material to the closure element 4 will depend on the type of material being metered.

A further advantage of the arrangement of the present invention is that since rotational inaccuracies of the metering worm 6 and the closure element 4 cannot always be avoided, proper seating of the sleeve 2 on the closure element 4 may be achieved by providing the sleeve 2 with a floating suspension, or in the alternative, by selecting the materials and configurations of the sleeve and closure element in such a manner that they adapt to each other. Thus, by way of example, the portion of the closure element 4 in which sleeve 2 is adapted to matingly engage with may be thin-walled and/or may be made of a resilient material. Conversely, at least a portion of the sleeve 2 may be likewise made of a resiliently deformable material.

When the apparatus and process of the present invention are used to meter material which has relatively large differences in grain or particle sizes, and when the material forms a flat heaping angle, a labyrinth type seal may be obtained by utilizing a closure element 4 which at its lower portion, has a stepped configuration with an annular sealing or bearing surface running substantially at right angles to the axis of rotation which is adapted to receive the outlet end 11 of the sleeve 2. This latter design also has the further advantage that any rotational errors in the metering worm 6 will have substantially little effect on the seal. It is further desirable to arrange the annular sealing surface in such a manner that material flowing over the closure element 4 would not back up, since this would produce an undesirable "slinging" action of the material.

As will be seen from the above-described preferred embodiments and the description of this application, many advantageous features are provided compared to the prior art arrangements, while at the same time avoiding the disadvantages of the prior art techniques.

It will be understood that various modifications can be made to the above-described embodiments without departing from the spirit and scope of the invention.

We claim:

1. In a rotary discharge controlling apparatus having a metering device adapted to meter material through a discharge outlet and having closure means adapted to prevent undesired trickling or leaking of material therefrom comprising:
   a chamber for receiving flowable granular like material;
   a filler conduit connected to said chamber;
   a metering worm operatively disposed within said conduit generally against longitudinal displacement;
   a rigidly arranged first cooperating movable closure sleeve means around said conduit movable only in response to a predetermined actuation thereof;
   controlled actuating means structurally linked to said first closure means to effect longitudinal movement thereof;
   and second cooperating closure means mounted in operative relationship to said first cooperating movable closure means, said second closure means having a generally smooth tapering conical configuration operatively arranged at and on the terminal end of said metering worm and being adapted to matingly engage in sealing relationship with said first cooperating movable closure means when said first and second closure means are brought into engagement.

2. The apparatus of claim 1 wherein said first closure means includes an axially movable sleeve-like member, and means for moving said axially movable member between first and second axial positions wherein at one of said positions, said first closure means is adapted to matingly engage in sealing relationship said second closure means, and at the other of said positions, said axially movable member is significantly spaced from the former to permit material to flow between said first and second closure means.

3. The apparatus of claim 1, wherein at least one of said first and second closure means is adapted to be rotated about a longitudinal axis.

4. The apparatus of claim 3, wherein said second closure means is adapted to be rotated about a fixed axis.

5. The apparatus of claim 1, wherein said first movable closure means includes guide means operatively associated therewith adapted to deflect metered material when said first and second closure means are in a spaced-apart relationship permitting material to be metered therebetween.

6. The apparatus of claim 1, wherein said second closure means having a generally tapering conical configuration has an upper end portion merging gradually into a generally cylindrical part connected to the terminal end portion of the metering worm.

7. The apparatus of claim 4, wherein said second closure means having a generally tapering conical configuration includes an annular sealing surface at the lower end thereof extending substantially transversely of the axis of rotation of said second closure means, said first closure means being to sealingly engage said annular sealing surface when said first and second closure means are in sealing engagement.

8. The apparatus according to claim 4, wherein said first closure means includes bearing means and a sleeve suspended from said bearing means for selective bearing contact with said second closure means when the latter is still rotating.

* * * * *